Oct. 20, 1953  S. P. BASEVI  2,655,999
VARIABLE-PITCH PROPELLER
Filed Sept. 14, 1951  3 Sheets-Sheet 1

INVENTOR
S. P. BASEVI
By Wilkinson & Mawhinney
ATTYS.

Patented Oct. 20, 1953

2,655,999

UNITED STATES PATENT OFFICE 2,655,999

VARIABLE-PITCH PROPELLER

Sidney Philip Basevi, Ensbury Park, Bournemouth, England, assignor to Rotol Limited, Gloucester, England, a British company Application September 14, 1951, Serial No. 246,617
In Great Britain September 29, 1950

10 Claims. (Cl. 170—160.32)

This invention concerns variable-pitch propellers and relates to hydraulic propellers of the type in which there is provided a pair of stops to limit the adjustment of the blades towards fine pitch, the stops being displaceable to enable the blades to perform movements within a first range extending beyond the normal pitch range and in a second range extending beyond the first extended range.

The first stop is provided so that when an aircraft is cruising or in high speed flight the pitch of the propeller is prevented from going below a certain value e. g. an angle of 40°: this stop is usually called the flight-safety stop. In other conditions of flight it is necessary that the pitch angle be less than the minimum allowed by the flight-safety stop and accordingly the latter must be displaceable to enable the blades to move into the first extended range. Again it is considered necessary that the movement of the blades towards fine pitch within the extended range be again limited (for example, to an angle of 30°) and this is done by the second stop referred to—the fine-pitch stop.

Under other conditions of flight it may be necessary to use a very fine pitch or even to put the propellers into reverse pitch so that it is further necessary to be able to displace the fine-pitch stop.

Hitherto, it has been arranged that the two stops be displaced and replaceable together i. e. when the flight-safety stop is removed the fine-pitch stop is also displaced. Under such circumstances there is no positive means to prevent the propeller moving to its limit of fine-pitch e. g. in reverse or negative pitch before the fine pitch stop has had time to reform.

The object of the present invention is to provide a novel construction of variable-pitch propeller of the type referred to in which when the first or flight-safety stop is displaced the second or fine-pitch stop remains operative. Stated another way the object of this invention is to provide a variable-pitch propeller of the type referred to in which distinct operations are required to remove each of the two stops and such distinct operations may not be performed at the same time.

According to the present invention a variable-pitch propeller comprises a hydraulic pitch-change jack having a movable element adjustable within a normal range of operation, within a first range extending beyond said normal range and within a second range extending beyond the first extended range, a first stop engageable by the movable element of the jack to prevent its travel beyond the normal range, a second engageable by the movable element of the jack after the element has passed the first stop to prevent its travel beyond the first extended range, means for displacing the stops in succession, restraint means normally preventing said stop-displacing means from acting to displace the second stop and means actuated by the movable element of the jack through the agency of the second stop, upon engagement of the latter by said element, for rendering the restraint inoperative.

A practical application of the present invention will now be described, by way of example only, with reference to the accompanying drawings whereof:

Figure 1:
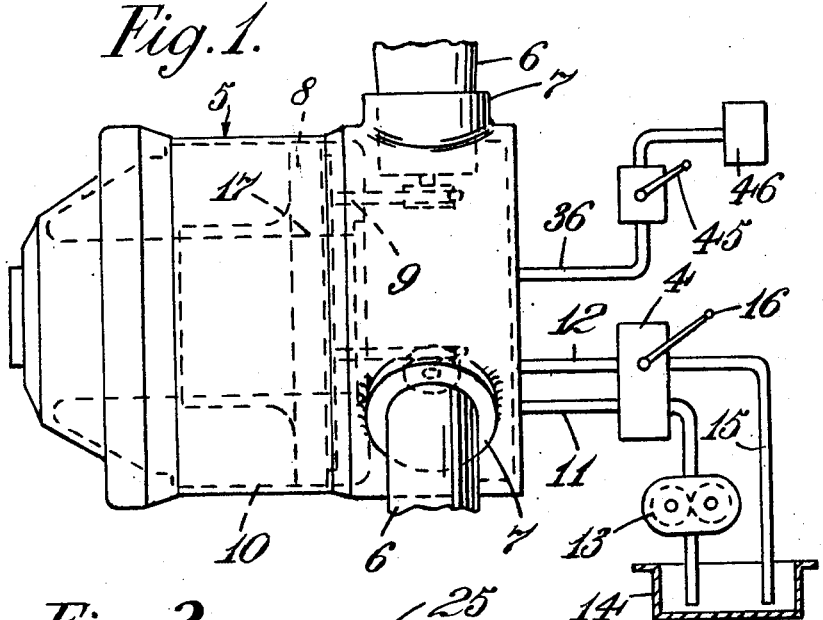
Figure 1 is a diagrammatic side elevation of a propeller in accordance with the present invention.

Referring to the drawings, and more particularly to Figure 1, the propeller comprises a hub 5 which carries a plurality of blades 6 mounted in sleeves 7 for pitch-change rotation in well known manner. Each blade 6 is connected with a piston 8 by a link 9, the piston 8 being axially movable in a cylinder 10 of a double acting jack. Hydraulic fluid may be supplied to the cylinder 10 through either pipe 11 or pipe 12 by a pump 13 from a sump 14, the fluid escaping from the exhaust side of the cylinder through pipe 15 to the sump 14. The passage of fluid to, and from, the cylinder 10 is controlled in conventional manner by a constant-speed, or governor, unit generally indicated by the reference numeral 4. When the unit 4 is adjusted, either manually or automatically, pressure fluid is delivered to the cylinder 10 and acting on the piston 8 moves it axially in one direction or the other thereby to adjust the pitch setting of the blades 6 through links 9. The unit 4 incorporates a flyweight governor which is driven by the engine and the speed setting of the governor is adjustable by the lever 16 all in usual manner.

Figure 3:
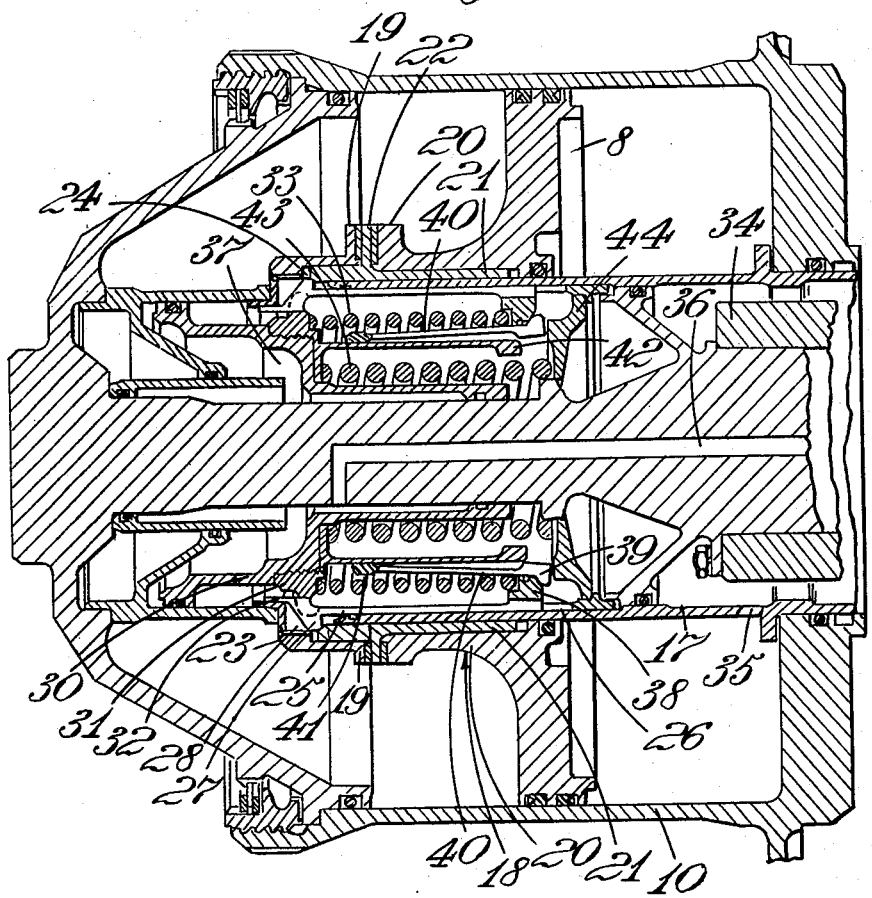
Figure 3 is a longitudinal section through the pitch change mechanism of the propeller of Figure 1 showing the position of the parts when the blades are in the first extended range of operation.
Figure 4:
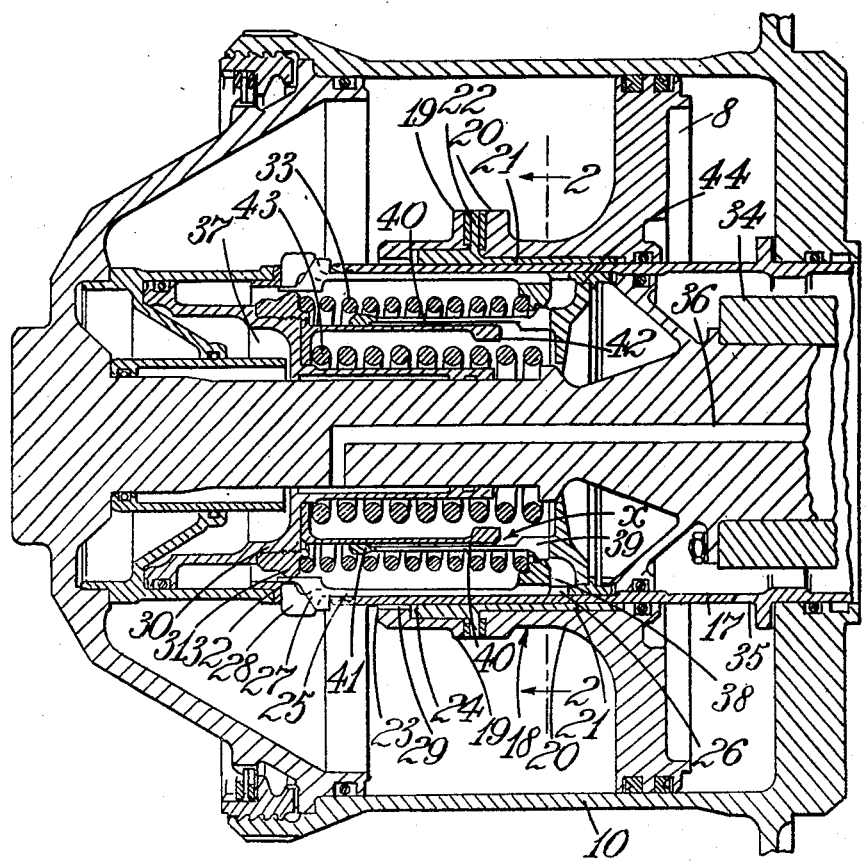
Figure 4 is a longitudinal section through the pitch change mechanism of the propeller of Figure 1 showing the position of the parts when the blades are in the normal range of operation.

Referring now to Figures 3 and 4, the piston 8 is of annular form and is mounted for sliding movement within the cylinder 10 upon a stationary sleeve 17 coaxially mounted within the cylinder, the piston 8 being formed with a flange assembly 18 which slides along the sleeve 17. The assembly 18 comprises a portion 20 integral with the piston 8, a portion 19 secured thereto and a cuff 21 lying within the assembly 18 and formed with a flange 22 to be received between the parts 19 and 20 so that cuff 21 moves with piston 8. The free end of the part 19 has an internal diameter greater than the external diameter of the sleeve 17 so that there is an annular space 29 between them. The end face 23 of the part 19 is adapted to engage the flight-safety stop for a purpose which will later be described, and similarly the end face 24 of the cuff 21 is adapted to engage the fine pitch stop.

Figure 2:
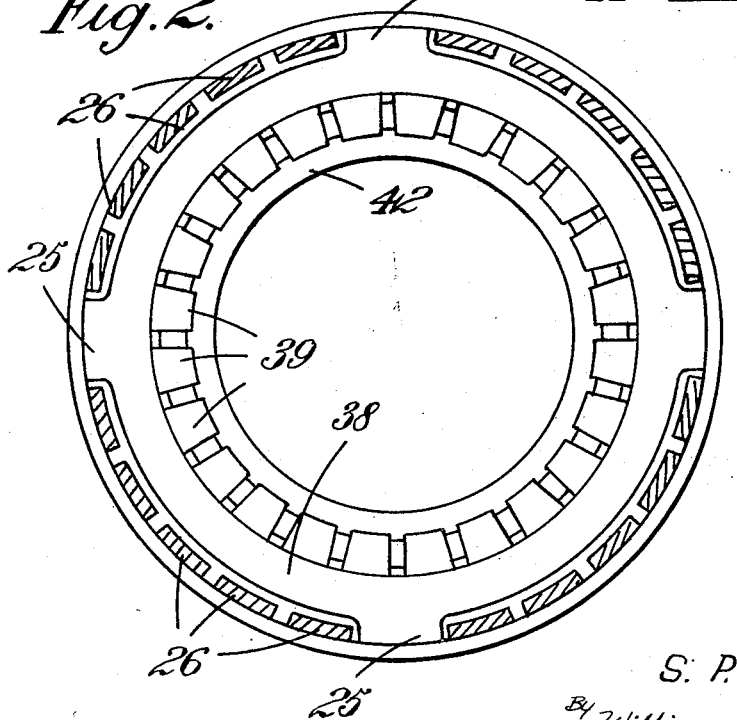
Figure 2 is a vertical section of the hub taken on a reduced scale on the line 2—2 of Figure 4.

Lying within the sleeve 17 are two sets of axially-extending, resilient fingers 25, 26 which are circumferentially spaced around the sleeve 17 (see Figure 2). Each finger 25 is integrally formed with a projection 27 and each finger 26 is integrally formed with a projection 28. Both sets of projections extend radially outwardly beyond the sleeve 17 to lie in the path of travel of the flange assembly 18. The projections 27 are so arranged in relation to the annular space 29 that they pass freely into said space whereas the projections 28 (since they lie radially outwardly beyond the projections 27) are arranged to engage the end face 23. As is evident from Figure 3 the projections 27 will engage the end face 24 of the cuff 21 although, as later described, this occurs only after the projections 28 have been displayed relatively to the end face 23 to pass into space 29. The projections 28 constitute the first or flight-safety stop referred to above and the projections 27 constitute said second or fine-pitch stop.

The ends of the spring fingers 25 and 26 which carry their projections tend to collapse radially inwardly and are normally supported so that both lie in the path of travel of flange 18 by a common piston member (the stop piston) generally indicated at 30. The stop piston 30 has a cylindrical surface 31 which is engaged by the inner faces of the projections 27 and 28—it will be noted that the projections 27 are extended at 32. With the stop piston 30 in the position shown in Figure 4 the projections 27, 28 are held in the path of travel of the flange assembly 18 and it will be appreciated that if the stop piston 30 is axially displaced to a sufficient extent the fingers 25 and 26 withdraw the projections 27 and 28 out of the path of travel of flange assembly 18.

The extensions 32 of the projections 27 ensure that the surface 31 holds fingers 25 out for a greater axial travel of stop piston 30 than fingers 26. Accordingly, when the piston 30 is first displaced to the right (from the position shown in Figure 4 to that shown in Figure 3) the surface 31 first disengages the projections 28 and thereafter with further displacement of the piston 30, it will disengage the projections 27.

The piston 30 is urged by a spring 33 to a position in which it holds the projections 27 and 28 in the path of travel of the piston flange assembly 18.

Pressure fluid from the pipe 11 is delivered to a cavity 34 and passes therefrom through one or more holes 35 into the cylinder 10 to act on the piston 8 and urge it towards the left as seen in Figure 3. A manual control 45 regulates the delivery of pressure fluid from a source of supply 46 along duct 36 and into space 37 to act on the piston member 30 and urge it towards the right against spring 33.

The spring 33 extends between the piston member 30 and a ring 38 which carries the fingers 26. The ring 38 co-operates with projections 39 each of which is formed at one end of a resilient finger 40. The fingers 40 are carried by a ring 41. The projections 39 lie in the path of travel of a sleeve 42 which is movable with the piston member 30. The projections 39 are urged radially outwardly by the resilience of fingers 40, and are normally prevented from doing so by the ring 38. However, if the latter is displaced to disengage the projections 39 the latter move clear of the sleeve 42. As shown in Figure 4 the sleeve 42 is capable of moving to the right by the amount $x$ and this distance is so selected that prior to the sleeve 42 engaging the projections 39 the surface 31 will disengage the projections 28— the projections 27 remaining supported by the surface 31. The projections 39 constitute the restraint means referred to above.

The piston member 30 is also urged to a position in which the surface 31 supports projections 27 and 28 by a spring 43 extending between the piston member 30 and a stationary part 44 of the hub assembly.

With the arrangement described, when hydraulic fluid under pressure is delivered to the chamber 34 it passes into the cylinder 10 and acts on the piston 8 whereby the latter is urged towards the left to move the blades in the fine-pitch direction and such movement is permitted until the end face 23 engages the projections 28 whereupon piston 8 is prevented from further travel in this direction. The projections 28 constitute the flight-safety stop. When pressure fluid is delivered through passage 36 into chamber 37 (at the discretion of the operator) it acts on the piston member 30 to move it axially against springs 33 and 43 so that surface 31 disengages the projections 28 whereby the resilient fingers 26 collapse radially inwardly and carry the projections 28 out of the path of travel of the end face 23. Consequently the piston 8 is freed for further movement towards the left to carry the blades within the first extended range. The piston 30, its pressure oil supplying means 46 and the control 45 in combination with the resilient fingers 26 constitute the release means for displacing the flight-safety stop as just described. The movement of the piston member 30 towards the right thereby disengaging the surface 31 from the projections 28 has brought the sleeve 42 against restraint means comprising the projections 39 so that the piston member 30 is prevented from further movement. Consequently the surface 31 remains in contact with the projections 27 to hold them in a position to engage the end face 24 and limit the extended travel of the piston 8 to the left. These conditions prevail until the end face 24 is brought against the projections 27 and, by the deliberate action of the operator, hydraulic fluid is delivered from chamber 34 to the cylinder 10 so that pressure within the cylinder is built up. The build up in pressure acting on the piston 8 is applied as an axial thrust to the end face 24 and so to the projections 27. When this axial face attains a value sufficient to overcome spring 33 the fingers 25 are moved, with piston 8, towards the left whereby the ring 38 is carried clear of the projections 39 and fingers 40 spring outwardly (as shown in Figure 3) to carry the projections 39 out of the path of travel of the sleeve 42. The piston member 30 is then free to move further to the right and this occurs when pressure fluid is delivered through passage 36 to chamber 37. With such further movement of the piston member 30, the surface 31 is carried clear of the projections 27 so that the resilient fingers 25 are enabled to collapse radially inwardly whereby the projections 27 disengage the end face 24. The flange assembly 18 is thus freed and the piston 8 is enabled to travel towards the left beyond the fine-pitch stop into the second extended range.

When the blades are returned, firstly, from the second pitch range into the first pitch range and, secondly into the normal pitch range the flange assembly 18 passes readily over the projections 27 and 28. This movement is preceded by release of pressure in the chamber 37 whereby piston member 30 is returned by springs 33, 43 to its normal position and the projections 27 and 28 are returned to lie in the path of travel of the flange assembly 18, the fingers being pushed radially outwardly by piston 30 which, as shown in Figure 4, is formed with inclined surfaces up which the fingers may readily ride to be pushed outwardly. Movement of the piston 8 into the normal pitch range enables the fingers 25 and ring 38 to be returned to spring 33 to a position in which the ring 38 engages projections 39 and returns them into the path of travel of the sleeve 42. The projections 27 and 28 are thus automatically returned to their operative positions when the blades are returned to their normal pitch range.

I claim:

1. In a variable-pitch propeller having a hub, a hydraulic cylinder and piston means within said hub, said hub being adapted to receive propeller blades the pitch of which may be varied and connecting means between said piston means and said propeller blades to adjust said blades within a range of normal operation, within a first range extending beyond said normal range and within a second range extending beyond the first extended range, a first stop means within said hub positioned to be engaged by the piston means to prevent movement of the blades beyond the normal pitch range, a second stop means within said hub operatively associated with said piston means after said piston means has passed said first stop to prevent its travel beyond said first extended range, stop displacing means operatively associated with said first and second stop means for displacing said stops in succession, restraint means within said hub operatively associated with said stop displacing means for normally preventing said stop displacing means from acting to displace said second stop means, and restraint by-pass means positioned within said hub and operatively associated with said piston means and second stop means whereby upon engagement of said second stop means by said piston means the said restraint means is rendered inoperative.

2. A variable-pitch propeller as claimed in claim 1 wherein the first and second stops comprise projections movable into and out of the path of travel of said piston means and wherein the means for displacing said stop projections comprises resilient fingers upon which are carried said projections and which urge them into and out of the path of said piston means and being common to both said first and second stops, the member holding said projections against displacement by their fingers, said member being movable relatively to said projections to release them, the said first stop projection being released upon completion of the first part of its movement and the said second stop projection on completion of the second part of its movement.

3. A variable-pitch propeller as claimed in claim 2 in which said holding member is a stop piston within said hub and positioned to move axially of said hub, the said stop piston being spring urged to hold said stop projections in the path of travel of said piston means.

4. A variable-pitch propeller as claimed in claim 3 in which said stop piston is operated hydraulically to release said stop projections independently of the operation of said hydraulic cylinder and piston means.

5. A variable-pitch propeller as claimed in claim 4 wherein said stop piston is normally prevented from performing the second part of its movement by said restraining means which comprises one or more projections in the path of said stop piston, each projection being carried by a restraint finger which urges the projection out of the path of said stop piston and being held against such displacement by said restraint by-pass means.

6. A variable-pitch propeller as claimed in claim 5 in which said restraint by-pass means comprises a movable ring member positioned to engage a plurality of stop piston projections, said member carrying the resilient fingers comprising said second stop.

7. A variable-pitch propeller as claimed in claim 6 wherein spring means urges said ring member to engage said stop piston projections.

8. A variable-pitch propeller as claimed in claim 7 wherein said spring means comprises a compression spring held between said stop piston and said ring member.

9. A variable-pitch propeller as claimed in claim 8 in which said ring member is moved to disengage said stop piston projections by said piston element upon the hydraulic pressure in said hydraulic cylinder and piston means exceeding a preselected value.

10. A variable-pitch propeller as claimed in claim 9 wherein said first stop projection is engageable by an end face of a cylindrical flange assembly of said piston means, said projection on displacement being accommodated within the flange assembly in which is also accommodated said second stop projection and which is formed with an internal stepped end face to engage the second stop projection.

SIDNEY PHILIP BASEVI.

References Cited in the file of this patent

UNITED STATES PATENTS

| Number | Name | Date |
|---|---|---|
| 2,433,990 | Hardy | Jan. 6, 1948 |
| 2,477,868 | Forman | Aug. 2, 1949 |
| 2,542,463 | Beard | Feb. 20, 1951 |

FOREIGN PATENTS

| Number | Country | Date |
|---|---|---|
| 590,913 | Great Britain | July 31, 1947 |